(12) United States Patent
Mills

(10) Patent No.: US 8,960,856 B2
(45) Date of Patent: Feb. 24, 2015

(54) BACKLIT PRINTING

(71) Applicant: Redwood Technologies LLC, Moultonboro, NH (US)

(72) Inventor: Michael Mills, Moultonboro, NH (US)

(73) Assignee: Redwood Technologies LLC, Moultonboro, NH (US)

(*) Notice: Subject to any disclaimer, the term of this patent is extended or adjusted under 35 U.S.C. 154(b) by 0 days.

(21) Appl. No.: 13/830,937

(22) Filed: Mar. 14, 2013

(65) Prior Publication Data

US 2013/0241988 A1 Sep. 19, 2013

Related U.S. Application Data

(60) Provisional application No. 61/611,514, filed on Mar. 15, 2012.

(51) Int. Cl.
*B41J 2/21* (2006.01)
(52) U.S. Cl.
CPC ............ *B41J 2/2132* (2013.01); *B41J 2/2117* (2013.01)
USPC ............................................................ 347/43

(58) Field of Classification Search
CPC ..................................................... B41J 2/2117
USPC ............................................................ 347/43
See application file for complete search history.

(56) References Cited

U.S. PATENT DOCUMENTS 7,562,957 B2 7/2009 Mills
2011/0027490 A1* 2/2011 Ishimoto et al. ............ 427/427.2

* cited by examiner

*Primary Examiner* — Julian Huffman
(74) *Attorney, Agent, or Firm* — Michael A. Glenn; Perkins Coie LLP

(57) ABSTRACT

A method and apparatus for printing digital ink jet images to be backlit by a light source is provided. Such backlit printing relies upon additional color pigment to be hidden in the white layer to add additional color density to the image as the back light source passes light through the layers. Print heads are divided into a region of multiple single color print head arrays and a region of white and color print region printed over a color print region. Such backlit printing may be used on both first surface printing and second surface printing. When such backlit printing is used, it may not be necessary to divide the print heads exactly in half as one layer may require less print nozzles than the other as the interlacing and or DPIs may vary for the different layers.

14 Claims, 18 Drawing Sheets

BACKLIT PRINTING

CROSS REFERENCE TO RELATED APPLICATIONS

This patent application claims priority from U.S. provisional patent application Ser. No. 61/611,514, BACKLIT PRINTING, filed Mar. 15, 2012, the entirety of which is incorporated herein by this reference thereto.

BACKGROUND OF THE INVENTION

1. Technical Field

This invention relates generally to ink jet printers. More specifically, this invention relates to ink jet printing of color images on transparent or translucent substrates.

2. Description of the Related Art

Backlit printing is a particular type of printing process for printing or applying images onto a substrate that is transparent or translucent with the intention of such images being lit from behind. An example of a backlit print is a large poster applied to the side of a bus stop sitting enclosure, where the natural light from the sun has the effect of lighting up the poster from behind for any individual passing by or sitting at the bus stop. Another example of a backlit print is a large, lit-up display of a vendor's perfume advertisement at a perfume section of a department store with the intention of getting the customer's attention in a large and attractive way.

An example of a method and apparatus for backlit imaging can be found in U.S. Pat. No. 7,562,957, METHODS AND APPARATUS FOR BACKLIT AND DUAL-SIDED IMAGING, issued Jul. 21, 2009 (referred to herein as '957) to inventor, M. D. Mills, and to M. Syverson, which is incorporated herein in its entirety by this reference thereto. It should be appreciated that '957 provides a detailed description of the technical background of backlit printing, which need not be reproduced herein, but rather, is incorporated herein by reference.

As '957 discloses, an example process for backlit imaging may be performed by printing a first image on the reverse side of a transparent substrate and subsequently printing over such first image with one or two layers of white ink. The white layer(s) serves as a backdrop such that the colors of the image appear properly when viewed for example from the front side of the transparent substrate. Then, a second image, which may be essentially the same image as the first image, is printed over the white layer(s). See, for example, FIG. 3C and FIG. 3D. Thus, in the end, an observer may view the first image in ambient light from the non-printed side of the transparent substrate and may view the second image in ambient light from the printed side of the transparent substrate.

Further, the process as taught in '957 has been found to be very slow and may reduce the speed of the printer by at least 70% and as much as 80%.

SUMMARY OF THE INVENTION

A method and apparatus for printing digital ink jet images to be backlit by a light source is provided. Such backlit printing relies upon additional color pigment to be hidden in a white layer to add additional color density to the image as the back light source passes light through the layers. Print heads are divided into a region of multiple single color print head arrays and a region of white and color print region printed over a color print region. Such backlit printing may be used on both first surface printing and second surface printing. When such backlit printing is used, it may not be necessary to divide the print heads exactly in half as one layer may require less print nozzles than the other as the interlacing and or resolution may vary for the different layers.

DETAILED DESCRIPTION OF THE INVENTION

Backlit Printing Background and at Least One Problem

Backlit imaging is a process by which an image is printed to be used in a light box application where the image is attached to an apparatus with a light arranged behind the image to provide illumination of the image from behind.

Figure 3:
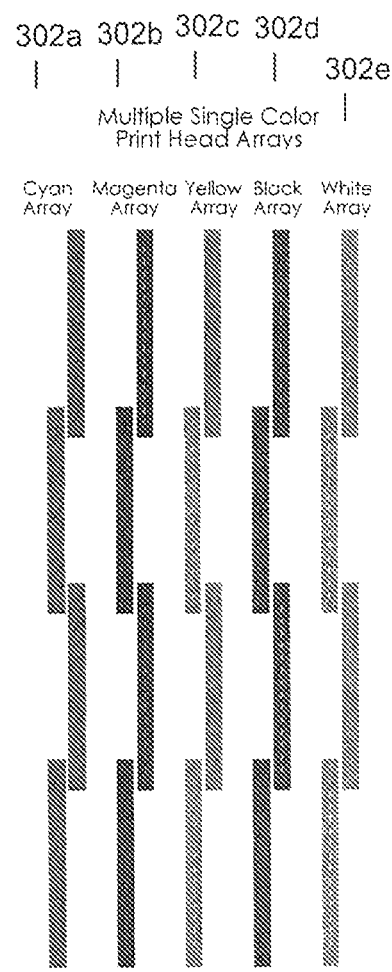
FIG. 3 is a diagram illustrating how a number of print head arrays can be arranged to form an array of heads using multiple color printing fluids, according to an embodiment.
Figure 3A:
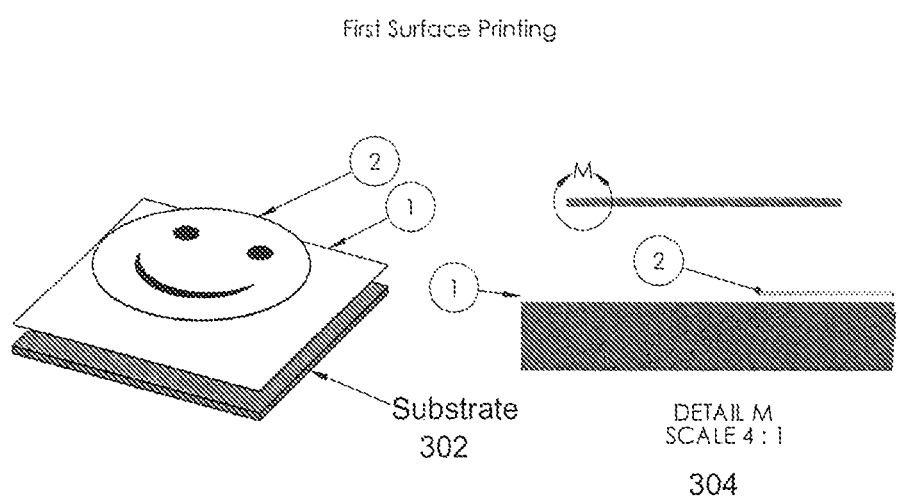
FIG. 3A is a diagram illustrating first surface printing, according to the prior art.
Figure 3B:
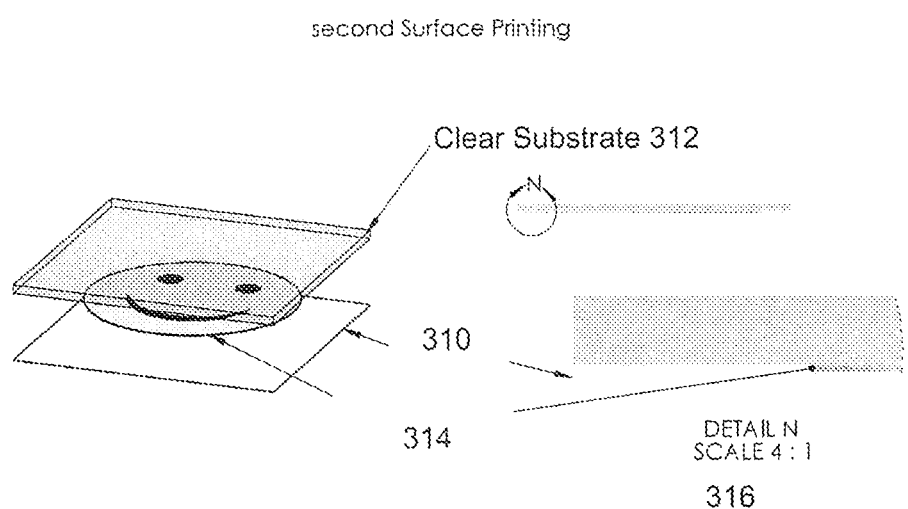
FIG. 3B is a diagram illustrating second surface printing, according to the prior art.

Typically this type of printing is printed for second surface viewing, as depicted in FIG. 3B discussed in detail hereinbelow.

Figure 9:
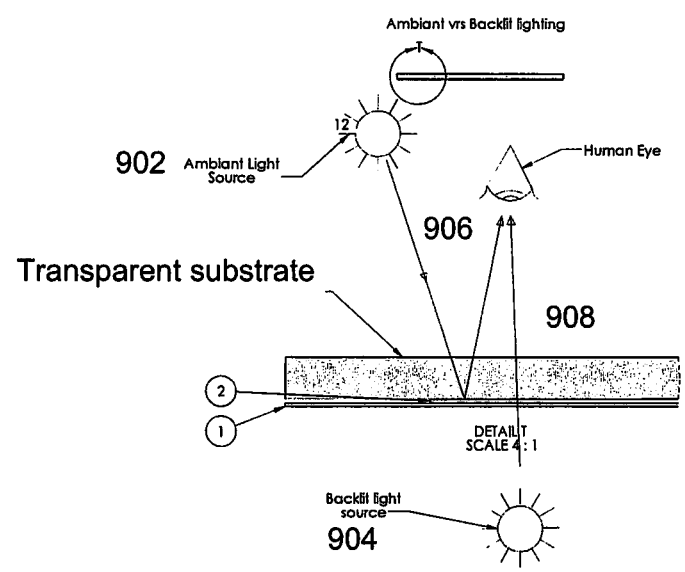
FIG. 9 is a schematic diagram showing the science of ambient versus backlit lighting, according to the prior art.

An example can be understood with reference to FIG. 9. In this light box application, when the ambient lighting 902 is of a greater intensity than the backlit lighting 904, the image will be reflected 906 from the surface of the image. When ambient lighting 902 is of intensity less than the back light 904, then the back light will pass through 908 the image and provide a lit appearance.

When backlit lighting 904 is stronger than ambient lighting 902, then the majority of the light used to see the image is filtered rather than reflected. When light is filtered through an image the appropriate amount of ink used for a reflective viewing is less than what is required for a filtered view. For example, as shown in FIG. 3B, which is discussed in detail hereinbelow, the image may look 'washed out'. In this case more color density may be needed for the filtered view. However, there cannot be a color density level on the top color layer sufficient to make the filtered image have the proper density without having the reflective view appear too dark. Thus, additional ink density may need to be applied in a layer that does not affect the reflective viewing.

Overview

A method and apparatus for printing digital ink jet images to be backlit by a light source is provided. Such new method and apparatus of backlit printing relies upon additional color pigment to be hidden in the white layer to add additional color density to the image as the back light source passes light through the layers. An example embodiment can be understood with reference to FIG. 6A, a multilayer image for second surface printing with backlit layer over image, which is discussed in further detail hereinbelow. In such method and apparatus, the print heads are divided in a method similar to FIG. 6, multiple single color print head arrays with white and color print region printed over a color print region, which is discussed in further detail hereinbelow. Such method and apparatus allows for pigment to be applied to a layer that is heavily mixed with white ink to minimize the effect of color density shift when viewed reflectively and yet still provide enough additional pigment to provide the proper color density when viewed filtered.

Figure 6:
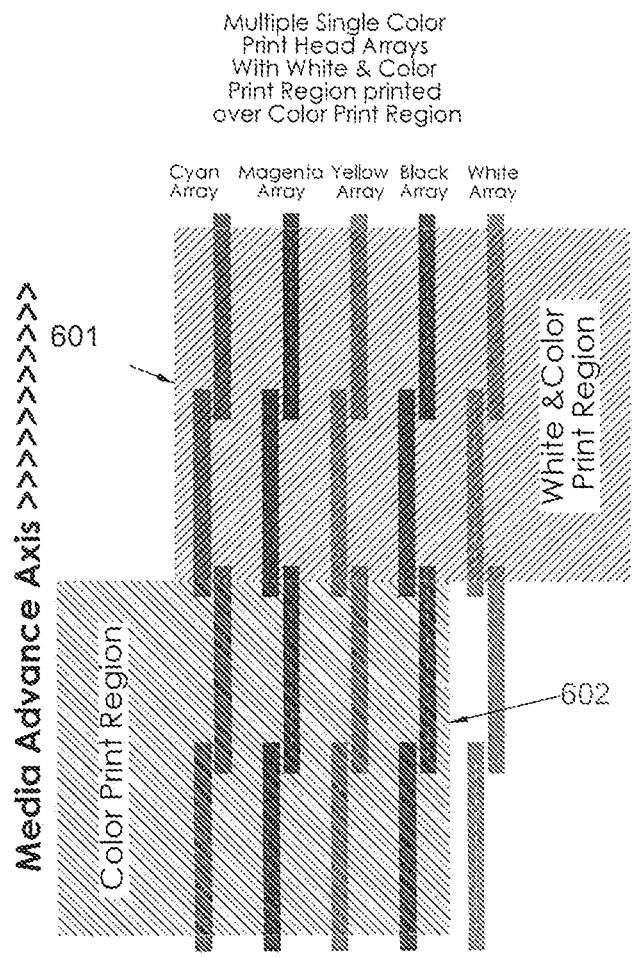
FIG. 6 is a diagram illustrating how a set of print head arrays may be divided to print a color image with a layer of mixed color and white ink over the top of the color image for second surface viewing, according to an embodiment.
Figure 6A:
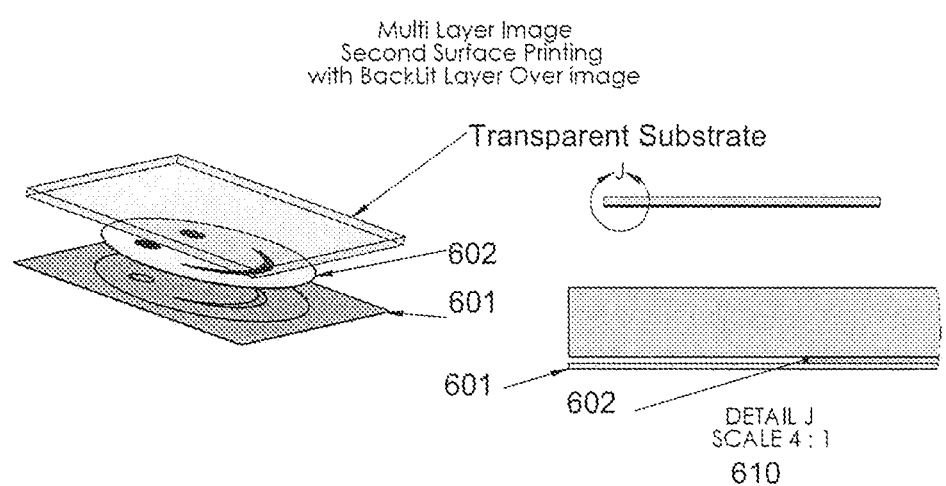
FIG. 6A shows an image produced by the arrangement illustrated in FIG. 6, according to an embodiment.
Figure 7:
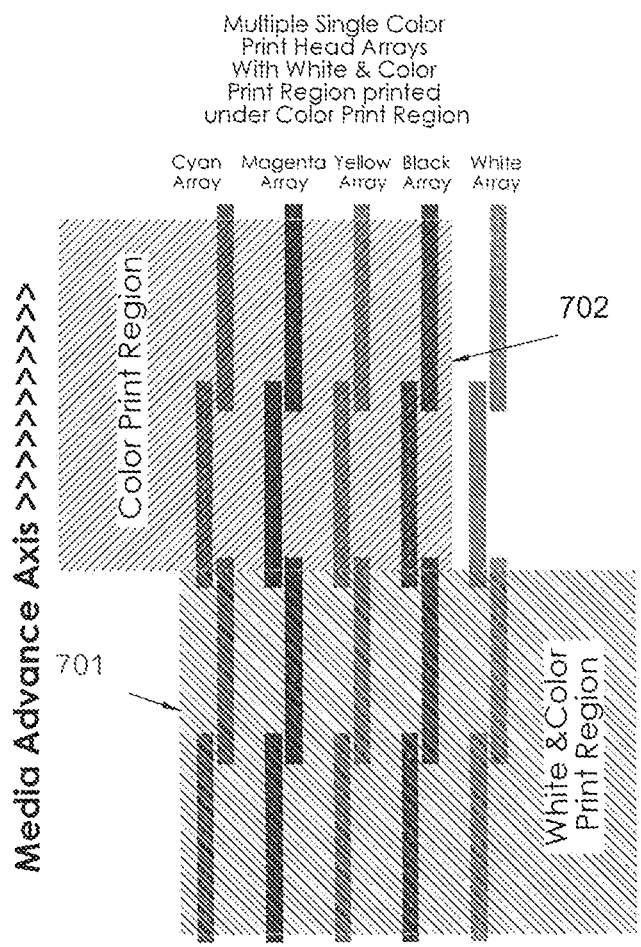
FIG. 7 is a diagram illustrating how a set of print head arrays may be divided to print a layer of mixed color and white ink with a color image over the top of the color image for first surface viewing, according to an embodiment.
Figure 7A:
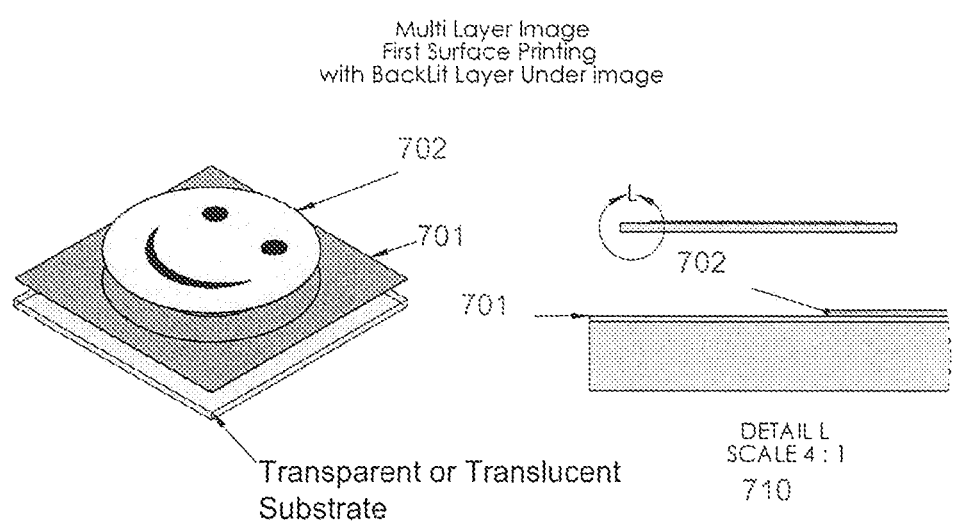
FIG. 7A shows an image produced by the arrangement illustrated in FIG. 7, according to an embodiment.

Such method and apparatus may be used on both first surface printing, e.g. FIGS. 7 and 7A and second surface printing, e.g. FIGS. 6 and 6A.

It should be appreciated that when such method and apparatus is used, it may not be necessary to divide the print heads exactly in half or in equal amounts if more than two layers are desired. For instance, one layer may require less print nozzles than the other layer as the interlacing or print resolution may vary for the different layers.

Improved Time

It has been found that an embodiment allows a printer to produce a backlit print in approximately half the time required by printers using a traditional three (3) or four (4) layer print mode. For instance, an embodiment allows a printer to product a backlit print in approximately half the time required by the techniques disclosed in '957. An example of three layer backlit imaging can be understood with reference to FIG. 3C, which is discussed in detail hereinbelow. And, an example of four layer backlit imaging can be understood with reference to FIG. 3D, which is discussed in detail hereinbelow.

Embodiments

In an embodiment, color pigment is hidden in the white layer to add additional color density to the printed image as the back light source passes light through the layers. In an embodiment, a plurality of print head arrays is provided where each print head array comprises a single process or spot color. One or more additional print head arrays are used to print a white ink. In an embodiment, all of the print head arrays arranged along a single print head axis.

In an embodiment, the print head arrays are divided into regions. In an embodiment, dividing the print head array is performed by a software controlled machine, such as a printer executing a printer driver. Such divided regions enable applying a first and second image onto a substrate of transparent or translucent nature suitable for backlit use. Examples of such translucent substrates include but are not limited to plastic and glass.

In an embodiment, one region of the print head arrays is used to print an image on the substrate and the second region is used to print a second image over or under the first image.

In an embodiment, the first image is a standard ink jet image comprising but not limited to Cyan, Magenta, Yellow, and Black (CMYK) ink. Such colored images may also include light inks or other non-process (aka spot) colors as well.

In an embodiment, a second image is applied, wherein the second image comprises the same image printed in the first layer as well as a solid fill of white ink essentially mixing the white ink and the colors together on this second image.

In the embodiments, it should be appreciated that the ink is dried instantly as each pass of the ink is applied. That is, such process is not a wet on wet process. Typically, the process is performed using ultra-violet (UV) ink and a UV curing lamp. However, other fast dry inks work as well. For example and as described in '957, a printer carriage may also contain, or have associated with it, one or more radiation sources, such as a UV lamp or a light emitting diode ("LED") source, to partially or fully cure the inks or other printing fluids after they are deposited onto the substrate. For example, radiation source may be located adjacent to the trailing edge of a series of print heads for applying radiation to the deposited fluids as the substrate moves through the system. Similarly, radiation sources may be positioned laterally adjacent to the series of print heads for partially or fully curing the deposited fluids.

Thus, it should be appreciated that at least one advancement allows the first image to appear as a normal image, when not backlit, but when backlit, the pigment in the white layer adds color density to the first image and has the effect of keeping the first image from washing out the color.

More specifically, in an embodiment, a multi-pass printing method printing a first multi-color image including a combination of colors on a substantially translucent substrate using a first group of ink jets within a print head array on a print carriage during a first pass of the carriage. Such first group of ink jets contains the colors necessary to print the first multi-color image. The substantially translucent substrate has a first side and a second side. In the embodiment, the first multi-color image is printed on the second side. The multi-pass printing method then prints a second mixed white and multi-color image by printing an at least partially opaque coating layer over the first multi-color image using a second group of ink jets during a subsequent pass of the carriage. It should be appreciated that the first group of ink jets and the second group of ink jets are configured in a same printer head carriage. As well, the at least partially opaque coating layer contains both white ink and colored inks mixed in with the white ink to facilitate quality viewing of the first multi-color image from the first side of the substantially translucent substrate both (a) when ambient lighting is at a level above the back lit source and (b) when the back light is at a level above ambient lighting.

In an embodiment, the first multi-color image and the second mixed white and multi-color image comprise different images causing a resulting backlit image to be different from a resulting image that is not backlit.

In an embodiment, the first group of ink jets comprise substantially one half of the ink jets in the print head array in the printer carriage and the second group of ink jets comprises substantially one half of the ink jets in the print head array in the printer carriage.

In an embodiment, the printer head carriage moves on an axis in a direction of travel back and forth across the substrate.

Detailed Discussion of Embodiments

Figure 1:
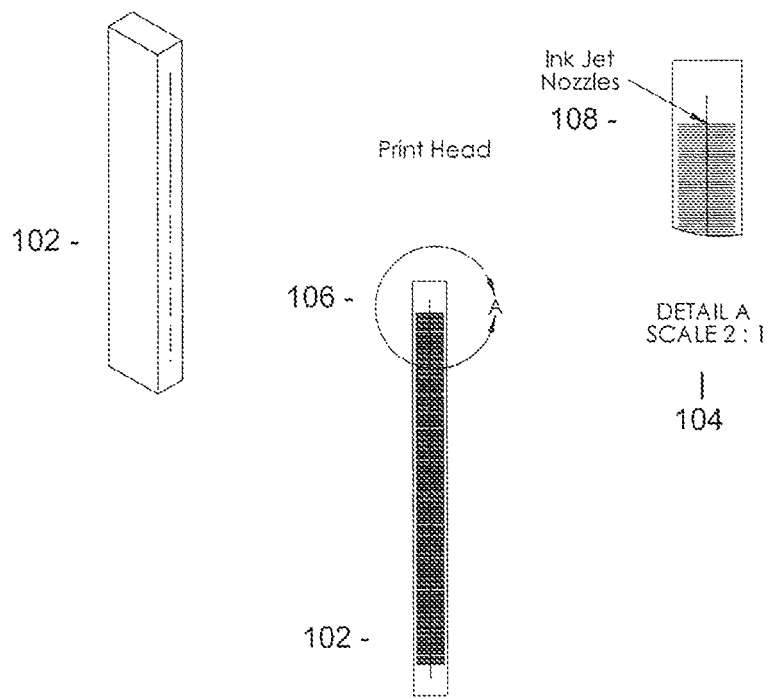
FIG. 1 is a diagram depicting a typical print head used in digital inkjet printers and illustrates a row of ink jet nozzles along the center axis of the print head, according to the prior art.

FIG. 1 depicts a typical print head 102 used in digital ink jet printers. Also shown is a magnified view 104 of a top portion 106 of print head 102. Magnified portion 104 illustrates a row of ink jet nozzles 108 along the center axis of print head 102.

Figure 2:
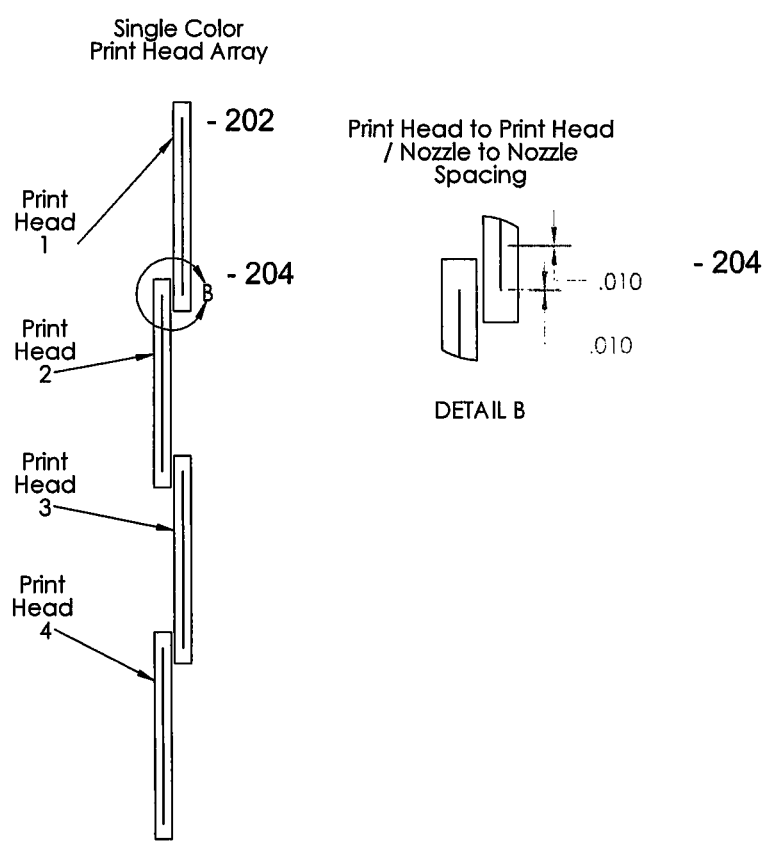
FIG. 2 is a diagram illustrating how a number of print heads can be arranged to form an array of print heads using a single color printing fluid, according to an embodiment.

FIG. 2 illustrates how a number of print head (print head 1, print head 2, print head 3, and print head 4) can be arranged to form an array of print heads using a single color printing fluid. Section B 204 is magnified to illustrate print head to print head and nozzle to nozzle spacing.

FIG. 3 illustrates how a number of print head arrays (302a, 302b, 302c, 302d, and 302e) can be arranged to form an array of heads using multiple color printing fluids.

FIG. 3A illustrates what is known as first surface printing. First surface printing may be considered printing on the top of a print substrate 302 and meant to be viewed from the top. First surface printing has a color image 2 applied to the bottom of the substrate and a layer of white ink 1 applied over that to form a backer. Also shown is a magnified side-view, M 304.

FIG. 3B illustrates what is known as second surface printing. Second surface printing may be considered printing on the bottom of a transparent print substrate and meant to be viewed through the transparent substrate. Such print has a layer of white ink 310 applied to the top of an opaque, often colored, substrate 312 and color image 314 applied over the white layer. Also shown is a magnified side-view, N 316.

Figure 3C:
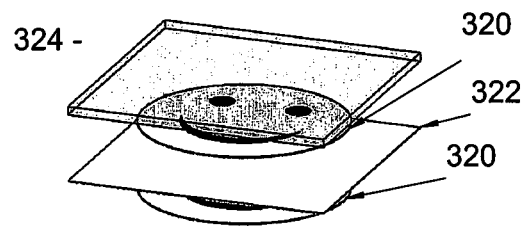
FIG. 3C is a diagram illustrating three layer backlit imaging, according to the prior art.

FIG. 3C illustrates three layer backlit imaging as taught by U.S. Pat. No. 7,562,957. Such imaging consists of a layer of color image 320 applied to the bottom of the substrate 324, followed by a white layer 322 and a second layer of color image 320 applied over that.

Figure 3D:
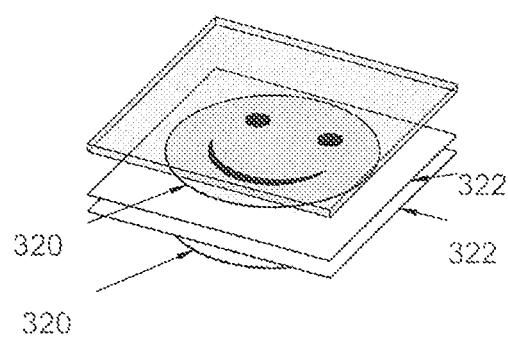
FIG. 3D is a diagram illustrating four layer backlit imaging, according to the prior art.

FIG. 3D illustrates four layer backlit imaging using layers of color image 320 and white layers 322.

Figure 4:
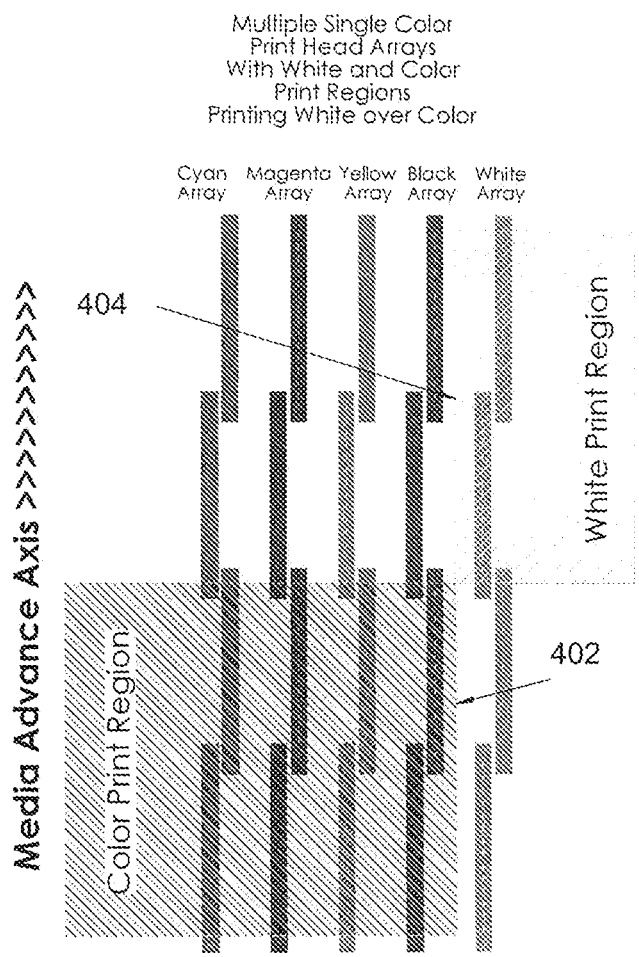
FIG. 4 is a diagram illustrating how a set of print head arrays may be divided to print a color image with a layer of white ink over the top of the color image for second surface viewing, according to an embodiment.

FIG. 4 illustrates how a set print head arrays could be divided into print a color image 402 with a layer of white ink 404 over the top of the color image for second surface viewing.

Figure 4A:
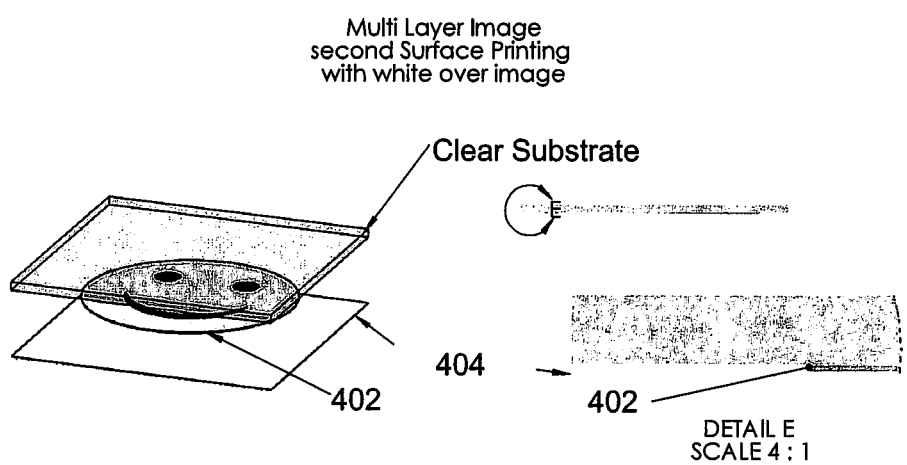
FIG. 4A shows an image produced by the arrangement illustrated in FIG. 4, according to an embodiment.

FIG. 4A illustrates the image produced by the arrangement illustrated in FIG. 4.

Figure 5:
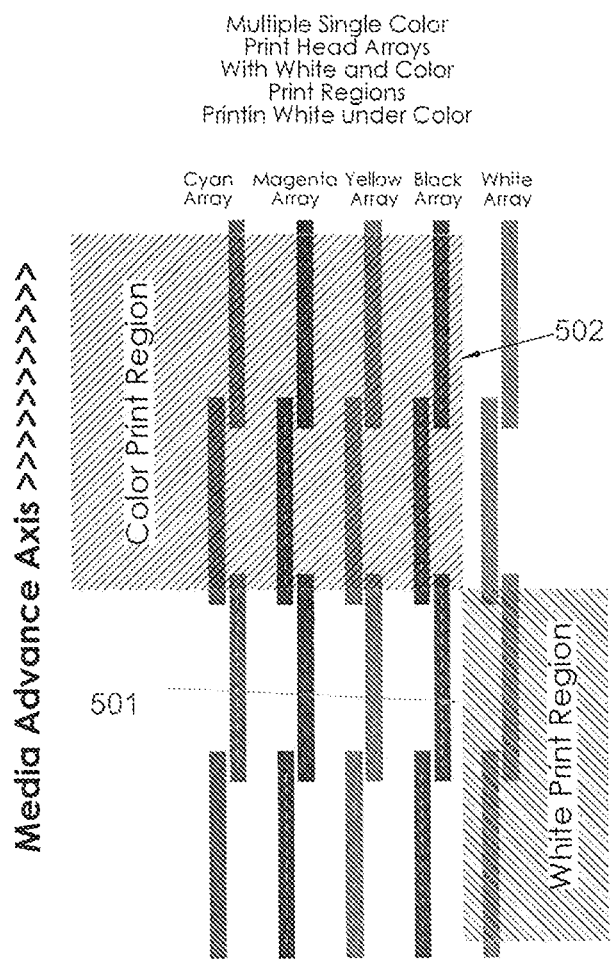
FIG. 5 is a diagram illustrating how a set print head arrays may be divided to print a color image with a layer of white ink under of the color image for first surface viewing, according to an embodiment.

FIG. 5 illustrates how a set of print head arrays can be divided to print a color image 502 with a layer of white ink 501 under of the color image for first surface viewing.

Figure 5A:
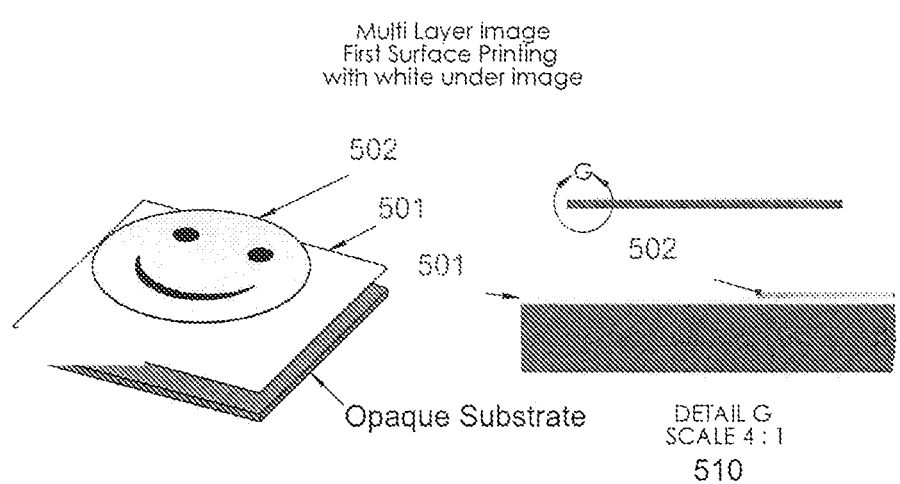
FIG. 5A shows an image produced by the arrangement illustrated in FIG. 5, according to an embodiment.

FIG. 5A illustrates the image produced by the arrangement illustrated in FIG. 5. Also shown is a magnified side-view, N 510.

FIG. 6 illustrates how a set of print head arrays can be divided to print a color image 602 with a layer of mixed color and white ink 601 over the top of the color image for second surface viewing.

FIG. 6A illustrates the image produced by the arrangement illustrated in FIG. 6. Layer 601 clearly shows the result of mixed color and white ink. The image in layer 601 is somewhat washed out and clearly has less intensity as image 602. Also shown is a magnified side-view, J 610.

FIG. 7 illustrates how a set of print head arrays can be divided to print a layer of mixed color and white ink 701 with a color image 702 over the top of the color image for first surface viewing.

FIG. 7A illustrates the image produced by the arrangement illustrated in FIG. 7. Layer 701 clearly shows the result of mixed color and white ink. The image in layer 701 is somewhat washed out and clearly has less intensity as image 702. Also shown is a magnified side-view, L 710.

Figure 8:
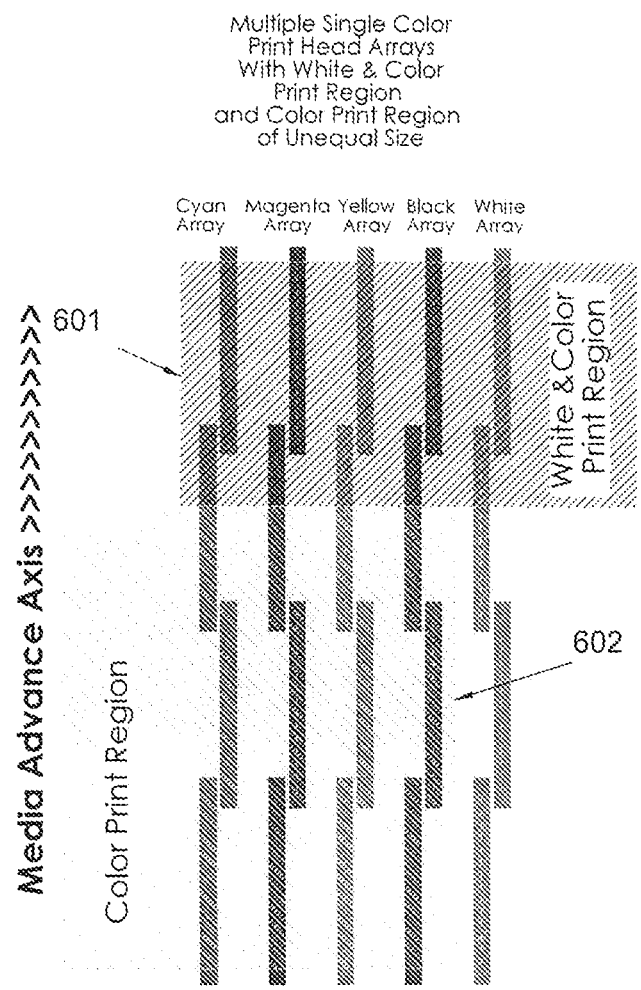
FIG. 8 is a diagram illustrating that the array need not be divided exactly in half to produce the different layers, according to an embodiment.

FIG. 8 illustrates the array need not be divided exactly in half to produce the different layers.

An Example Machine Overview

Figure 10:
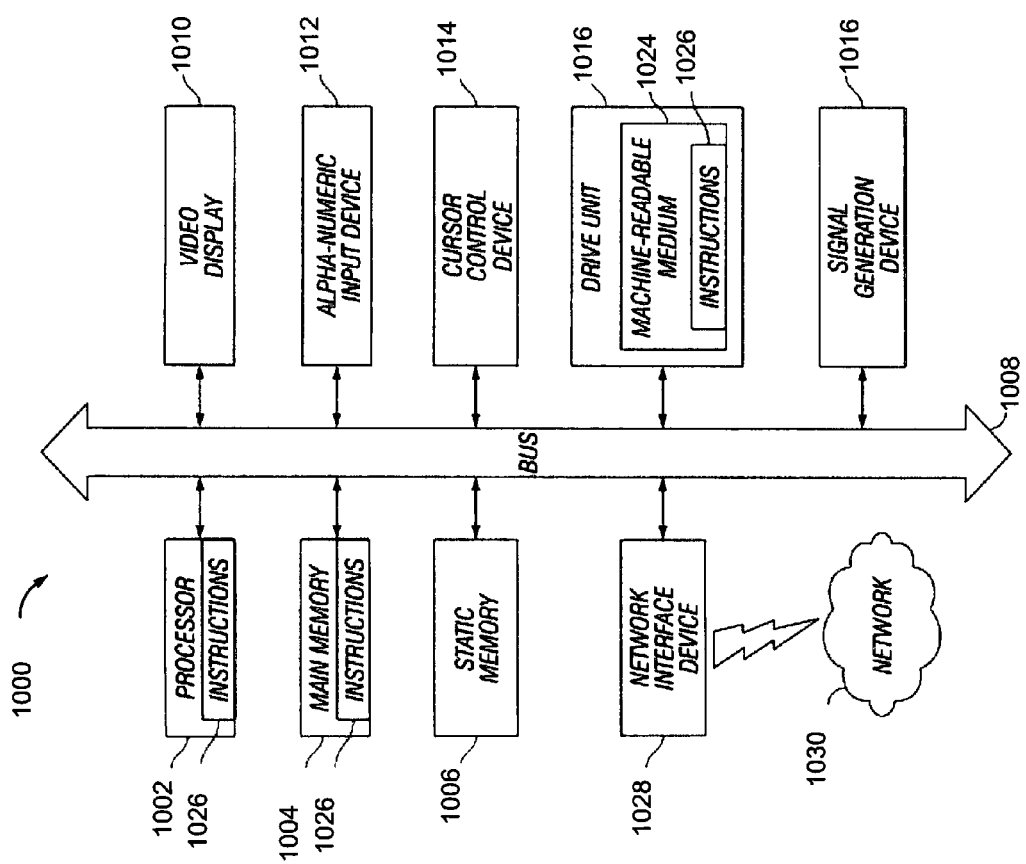
FIG. 10 is a block schematic diagram of a system in the exemplary form of a computer system according to an embodiment.

FIG. 10 is a block schematic diagram of a system in the exemplary form of a computer system 1000 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1000 includes a processor 1002, a main memory 1004 and a static memory 1006, which communicate with each other via a bus 1008. The computer system 1000 may further include a display unit 1010, for example, a liquid crystal display (LCD) or a cathode ray tube (CRT). The computer system 1000 also includes an alphanumeric input device 1012, for example, a keyboard; a cursor control device 1014, for example, a mouse; a disk drive unit 1016, a signal generation device 1018, for example, a speaker, and a network interface device 1028.

The disk drive unit 1016 includes a machine-readable medium 1024 on which is stored a set of executable instructions, i.e. software, 1026 embodying any one, or all, of the methodologies described herein below. The software 1026 is also shown to reside, completely or at least partially, within the main memory 1004 and/or within the processor 1002. The software 1026 may further be transmitted or received over a network 1030 by means of a network interface device 1028.

In contrast to the system 1000 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to perform backlit printing on such internet-enabled or other network-enabled devices, servers, or clients. It further should be appreciated that one or more cloud computing embodiments include backlit printing using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A multi-pass printing method comprising:
   printing a first multi-color image including a combination of colors on a substantially translucent or transparent substrate using a first group of ink jets within a print head array on a print carriage during a first pass of the carriage, wherein the first group of ink jets contains the colors necessary to print the first multi-color image, wherein the substantially translucent or transparent substrate has a first side and a second side, and wherein the first multi-color image is printed on the second side; and
   printing an at least partially opaque coating layer over the first multi-color image using a second group of ink jets during a subsequent pass of the carriage, wherein the at least partially opaque coating layer comprises a layer of ink, the layer of ink comprising a combination of white ink and process inks, wherein the at least partially opaque coating layer comprises a second multi-color image in the form of but with less intensity than the first multi-color image, wherein the first group of ink jets and the second group of ink jets are both configured in the printer carriage, and wherein the at least partially opaque coating layer enables viewing of the first multi-color image from the first side of the substantially translucent or transparent substrate both (a) when ambient lighting is at a level above a back lit source and (b) when back light is at a level above ambient lighting.

2. The method of claim 1, wherein the substrate comprises plastic.

3. The method of claim 1, wherein the substrate comprises glass.

4. The method of claim 1, wherein the first group of ink jets comprises substantially one half of the ink jets in the print head array in the printer carriage.

5. The method of claim 1, wherein the second group of ink jets comprises substantially one half of the ink jets in the print head array in the printer carriage.

6. The method of claim 1, further comprising moving the printer head carriage on an axis in a direction of travel back and forth across the substrate.

7. A printing apparatus comprising:
   a processor;
   a group of ink jets within a print head array on a print carriage controlled by the processor to print a first multi-color image including a combination of colors on a substantially translucent or transparent substrate during a first pass of the carriage, wherein the first group of ink jets contains the colors necessary to print the first multi-color image, wherein the substantially translucent or transparent substrate has a first side and a second side, and wherein the first multi-color image is printed on the second side; and
   a second group of ink jets controlled by the processor to print an at least partially opaque coating layer over the first multi-color image during a subsequent pass of the carriage, wherein the at least partially opaque coating layer comprises a layer of ink, the layer of ink comprising a combination of white ink and process inks, wherein the process inks form a second multi-color image in the form of but with less intensity than the first multi-color image, wherein the first group of ink jets and the second group of ink jets are both configured in the print carriage, and wherein the at least partially opaque coating layer enables viewing of the first multi-color image from the first side of the substantially translucent or transparent substrate both (a) when ambient lighting is at a level above the back lit source and (b) when the back light is at a level above ambient lighting.

8. The apparatus of claim 7, wherein the substrate comprises plastic.

9. The apparatus of claim 7, wherein the substrate comprises glass.

10. The apparatus of claim 7, wherein the first group of ink jets comprises substantially one half of the ink jets in the print head array in the printer carriage.

11. The apparatus of claim 7, wherein the second group of ink jets comprises substantially one half of the ink jets in the print head array in the printer carriage.

12. The apparatus of claim 7, wherein the printer head carriage moves on an axis in a direction of travel back and forth across the substrate.

13. A multi-pass printing method comprising:
   printing a first multi-color image including a combination of colors on a substantially translucent or transparent substrate using a first group of ink jets within a print head array on a print carriage during a first pass of the carriage, wherein the first group of ink jets contains the colors necessary to print the first multi-color image, wherein the substantially translucent or transparent substrate has a first side and a second side, and wherein the first multi-color image is printed on the second side; and
   printing an at least partially opaque coating layer over the first multi-color image using a second group of ink jets during a subsequent pass of the carriage, wherein the at least partially opaque coating layer comprises a layer of ink, the layer of ink comprising a combination of white ink and process inks, wherein the process inks form a second multi-color image different from and with less intensity than the first multi-color image, wherein the first group of ink jets and the second group of ink jets are both configured in the printer carriage, and wherein the at least partially opaque coating layer causes a resulting backlit image to be different from a resulting image that is not backlit.

14. A printing apparatus comprising:

a processor;

a group of ink jets within a print head array on a print carriage controlled by the processor to print a first multi-color image including a combination of colors on a substantially translucent or transparent substrate during a first pass of the carriage, wherein the first group of ink jets contains the colors necessary to print the first multi-color image, wherein the substantially translucent or transparent substrate has a first side and a second side, and wherein the first multi-color image is printed on the second side; and a second group of ink jets controlled by the processor to print an at least partially opaque coating layer over the first multi-color image during a subsequent pass of the carriage, wherein the at least partially opaque coating layer comprises a layer of ink, the layer of ink comprising a combination of white ink and process inks, wherein the process inks form a second multi-color image different from and with less intensity than the first multi-color image, wherein the first group of ink jets and the second group of ink jets are both configured in the printer carriage, and wherein the at least partially opaque coating layer causes a resulting backlit image to be different from a resulting image that is not backlit.

* * * * *